(12) United States Patent
Senturk

(10) Patent No.: US 7,449,503 B2
(45) Date of Patent: Nov. 11, 2008

(54) GLASS MICROSPHERES WITH MULTIPLE BUBBLE INCLUSIONS

(75) Inventor: Ufuk Senturk, Bridgeport, PA (US)

(73) Assignee: Potters Industries Inc., Valley Forge, PA (US)

( * ) Notice: Subject to any disclaimer, the term of this patent is extended or adjusted under 35 U.S.C. 154(b) by 599 days.

(21) Appl. No.: 10/967,540

(22) Filed: Oct. 18, 2004

(65) Prior Publication Data

US 2006/0084724 A1    Apr. 20, 2006

(51) Int. Cl.
*C08J 9/32* (2006.01)

(52) U.S. Cl. ............. 523/218; 428/402; 428/406; 523/219; 524/494

(58) Field of Classification Search ........... 523/218, 523/219; 524/494; 428/402, 406
See application file for complete search history.

(56) References Cited

U.S. PATENT DOCUMENTS

| | | |
|---|---|---|
| 2,334,578 A | 11/1943 | Potters |
| 2,619,776 A | 12/1952 | Potters |
| 2,945,326 A | 7/1960 | Wood |
| 3,129,086 A | 4/1964 | Veatch et al. |
| 3,193,401 A | 7/1965 | Alexander et al. |
| 3,230,064 A | 1/1966 | Veatch et al. |
| 3,279,905 A | 10/1966 | Wood et al. |
| 3,365,315 A | 1/1968 | Beck et al. |
| 3,419,403 A | 12/1968 | Searight et al. |
| 3,495,961 A | 2/1970 | Lange |
| 3,499,745 A | 3/1970 | Plumat |
| 3,946,130 A | 3/1976 | Tung et al. |
| 4,063,916 A | 12/1977 | De Vos et al. |
| 4,677,022 A | 6/1987 | Dejaiffe et al. |
| 4,778,502 A | 10/1988 | Garnier et al. |
| 4,983,550 A | 1/1991 | Goetz et al. |
| 6,171,702 B1 * | 1/2001 | Malhotra et al. ......... 428/411.1 |

FOREIGN PATENT DOCUMENTS

| | | |
|---|---|---|
| EP | 1 135 343 B1 | 7/2003 |
| GB | 1246582 | 9/1971 |
| WO | WO 2006/118901 | 11/2006 |

OTHER PUBLICATIONS

Präzisions-Glasperlen (German language—5 pages).
Otto R. Strauch, Spherical Glass Fillers; SPE Journal, vol. 25, No. 9, Sep. 1969; pp. 38-43.
Sovitec Cataphote; Solid Glass Beads Microperl Technical Additive for Resins (9 pages).
Sovitec; Microperl Used in SMCs and BMCs; Apr. 1998; pp. 1-13.
Sovitec; Use of Microperl in Polyester Resins; Apr. 1998; pp. 1-15.
Sovitec; Solid Glassbeads Microperl Reinforcing Filler For Thermosetting Resins; Oct. 1997; pp. 1-10.
Sovitec; Solid Glassbeads Microperl Reinforcing Filler for Thermoplastic Resins; Oct. 1997; pp. 1-13.
Sovitec; Polyamide Filled With Microperl; Apr. 1998; pp. 1-15.
V. V. Budov, "Hollow Glass Microspheres Use, Properties, and Technology" (Review), Glass and Ceramics, Jul. 1, 1994, pp. 230-235, vol. 51, No. 7/8, Springer, New York, NY, USA.

* cited by examiner

*Primary Examiner*—Edward J Cain
(74) *Attorney, Agent, or Firm*—RatnerPrestia

(57) ABSTRACT

Glass microspheres containing a substantial percentage of spheres having two or more optically visible gas bubbles per sphere provide a high level of whitening to composite materials containing them. The volume of gas bubbles is between 8 and 35 percent of the volume of the spheres on average, and the spheres exhibit good resistance to breakage upon exposure to high pressures such as may be encountered in polymer extrusion processes. The spheres have a median particle diameter of between 5 and 100 μm, and at least 10% by number of the spheres incorporate at least two gas bubbles.

39 Claims, 1 Drawing Sheet

GLASS MICROSPHERES WITH MULTIPLE BUBBLE INCLUSIONS

FIELD OF THE INVENTION

This invention relates to glass microspheres. More particularly, it relates to glass microspheres containing two or more trapped bubbles, and uses of such microspheres in whitening polymer or other compositions.

BACKGROUND OF THE INVENTION

Small glass beads, or microspheres, have traditionally been used in a variety of applications. In one widely-used application, the microspheres are added to any of a variety of polymer compositions, with these compositions benefiting from the inclusion of the beads in any of a number of ways. For example, they may be used as reinforcement fillers for both thermoplastics and thermosetting resins to improve physical and thermal properties, reduce cost, and solve production problems. The spherical shape and non-porous morphology provides certain advantages when used in such applications. Incorporation of spherical glass particles increases the flow rate of polymers during forming operations, much as though the spheres are acting as tiny ball bearings. The non-porous and isotropic qualities of the microspheres may allow use of higher filler loadings, thereby reducing cost, and may further minimize the viscous drag between particles and allow for uniform and controllable shrinkage of molded parts during the cooling cycle. Typically, this helps to achieve formation of a smooth surface finish on the resulting parts.

Other particulate fillers, such as calcium carbonate, talc, and titanium dioxide may be used in polymer composites, coatings, and other formulation where whitening of the finished product is desired. However, many such fillers have irregular shapes and high surface areas that result in impeded flow during molding or other forming operations, thereby making such forming operations more difficult. It would be desirable to be able to use fillers that whiten compositions containing them, and provide the advantages afforded by spherical particles.

SUMMARY OF THE INVENTION

The invention provides a composition including glass spheres, wherein the spheres have on average a total gas bubble volume of at least 8% and at most 35% relative to an average sphere volume. The spheres have a median particle diameter of between 5 and 100 µm, and at least 10% by number of the spheres incorporate at least two gas bubbles.

DETAILED DESCRIPTION OF THE INVENTION

Microspheres With Multiple Entrapped Bubbles

Figure 1:
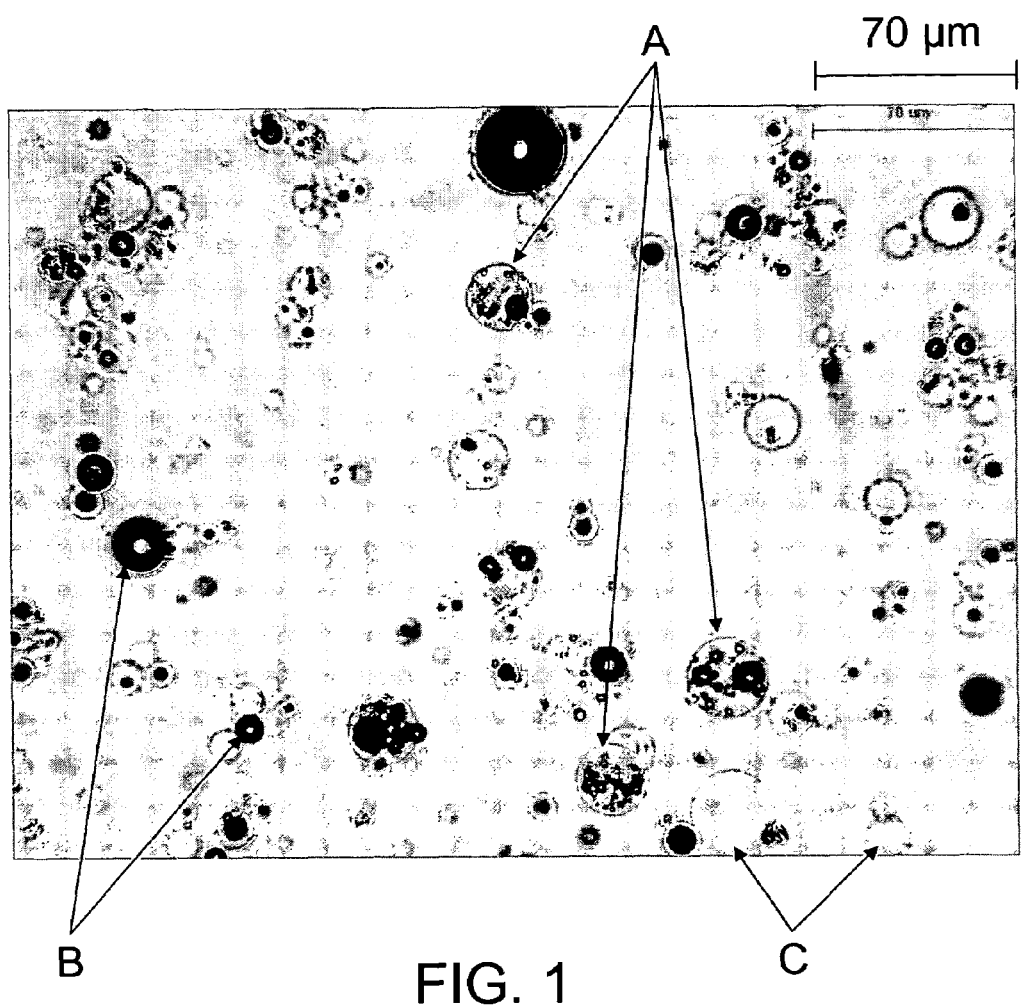
FIG. 1 is a photograph of exemplary glass microspheres according to the invention.

The invention provides glass microspheres, methods of making them, and compositions including them. The microspheres incorporate on average at least two separate gas bubbles per microsphere, and differ from solid glass microspheres and from hollow glass microspheres that contain a single bubble.

The inventors have found that products can be made with the microspheres of this invention having good whiteness while retaining benefits associated with the use of glass microspheres. As used herein, the terms "microsphere" and "sphere" will be used interchangeably, and should be understood to have the same meaning when used to denote the spherical, bubble-containing glass particles of the invention.

Microspheres according to the invention may be made with a range of volume % gas bubble inclusions, and thus a range of densities. The ability to match the density of the spheres to that of the matrix which will be whitened by them is an important issue in many applications, since spheres of too low a density tend in many cases to float to the surface of the composition and create an esthetically unsuitable finish. In addition, such spheres, because they contain a high volume % of gas inclusion in the form of a single bubble, tend to be susceptible to breakage under the shear and/or pressure conditions encountered during extrusion, injection, or other processing operations. This may create problems during processing, for example resulting in reduced flow, increased equipment wear, and a rough surface on the finished part.

The use of glass spheres having a lower volume % of gas in the form of a single bubble, and thus having a higher and more suitable density, might conceivably be sought in an effort to solve the above problems, but practical methods for making such microspheres do not appear to be available. The inventors have now found that suitable whitening power may be provided by making microspheres that realize a suitable density by including multiple bubbles per sphere. These microspheres may provide the advantages described above regarding flow and surface finish, while reducing or avoiding float-out of particles. Additionally, and unlike hollow spheres of lower density containing a single bubble each, these microspheres provide good resistance to breakage under high pressure conditions.

Without wishing to be bound by any particular theory or explanation, it is believed that the whiteness provided by the microspheres of this invention is at least partially due to the presence of an interfacial area between the bubble(s) and the glass. This interfacial area is believed to result in increased light scattering, which is manifested in greater whiteness as measured by the Hunter L,a,b method, particularly the L value, in compositions containing the microspheres. As used herein, reference to microspheres providing a certain Hunter L value are to be understood according to measurements made on a cured polyester composition containing the microspheres according to the methods set forth in the Examples below. Typical microspheres according to the invention may provide a Hunter L value of at least 60, more typically at least 70.

Glass microspheres according to the invention may be of any size. Typically, they will have a median particle diameter (d50) of between 5 and 100 µm, more typically between 10 and 50 µm, and most typically between 20 and 40 µm. In general, compositions including smaller microspheres provide a higher level of whiteness per unit weight of added microspheres to compositions containing them, given an equal volume percent and number of bubbles per average microsphere.

The microspheres of this invention may contain between 8 and 35 volume percent of bubbles, typically between 8 and 20 volume percent, and more typically between 10 and 12 volume percent, and a significant percentage of spheres containing two or more bubbles, as will be described below. The microspheres may have a density of at least 1.1 g/cc, with the exact value depending upon a number of factors including the composition of the glass and the volume percent of bubbles in the microspheres. Typically, the density will be between 1.90 and 2.51 g/cc, more typically between 2.15 and 2.30 g/cc. The volume percent of bubbles in a sample of microspheres may be calculated by use of the following equation:

$$\% \text{ bubble volume} = [1-(D/D_0)] \times 100$$

where D is the glass microsphere density and $D_0$ is the solid glass density.

For purposes of this invention, the term "bubbles" means voids that are visible under an optical microscope. Without wishing to be bound by any particular theory or explanation, it is believed that the presence of a sufficient number of multiple bubbles in the microspheres provides a relatively high bubble-glass interfacial surface area, resulting in increased light scattering due to the rapid change in refractive index at the interface. Smaller microspheres according to the invention typically afford a greater level of light scattering than do larger ones, although there may be limits to this generalization at extremely small particle sizes.

FIG. 1 is a micrograph of typical microspheres according to the invention. Several of the spheres containing two or more gas bubbles each are shown at A, spheres containing a single bubble are shown at B, and solid spheres (containing no optically visible bubbles) are shown at C.

The glass microspheres of this invention are such that at least 10% of the spheres by number contain two or more bubbles. In a typical case, the amount will be at least 20%. Levels within the range of 20% to 30% are common, although amounts up to and including 100% are to be considered within the scope of this invention, since it is desirable for as many as possible of the microspheres to contain multiple bubbles. In the case where 20-30% of the microspheres contain two or more bubbles, it is typical that another 20-30% have only one bubble and 40-60% have no bubbles.

It has been found that many of the solid (no bubble) microspheres in a given sample are typically found in the low-diameter particle size range (less than 10 μm). Excluding from the count all microspheres having a diameter less than this figure, at least 12% of the particles contain at least two bubbles. In a typical case, the amount will be at least 30%. Typically 30-40% have at least two bubbles, 30-40% have only one bubble, and 20-40% have no bubbles. The above-mentioned counts can conveniently be performed by sprinkling a sample of glass microspheres onto an optical microscope slide and adding a drop of mineral oil. The microspheres are then viewed in transmitted light mode, with the bubbles being counted manually.

Glass microspheres according to the invention may be especially useful in applications where resistance to high pressure is an important performance parameter. For example, the microspheres may be incorporated into polymers to produce composite materials for extrusion, under which conditions sphere breakage has traditionally been observed for prior art microspheres having only a single bubble each. Such breakage may cause undesirable effects such as decreased flowability of the polymer and decreased whiteness of the composite material. It has been found that microspheres according to the invention have good resistance to breakage under elevated pressures, and thus may perform well in polymer formulations for extrusion.

The pressure resistance of the microspheres can be tested by subjecting the material to isostatic compressive stress. This can be done using a Parr Bomb, wherein the microspheres are placed under hydrostatic gas pressure using nitrogen gas at 3000 psi, held at that pressure for 30 seconds, and returned to atmospheric pressure. If the high pressure breaks some of the microspheres, the remnants of these spheres will no longer be able to exclude as high a volume of the pressurized test gas as did the unbroken spheres, and a volume loss will therefore be registered. Thus the pressure resistance of the microspheres is inversely related to the percent change in volume of the microsphere sample resulting from the pressure treatment. This volume change can be calculated by measuring the theoretical density of the microspheres before and after pressurization using a gas pycnometer such as a Pentapycnometer, available from Quantachrome Instruments of Boynton Beach, Fla. Microspheres according to the invention typically exhibit a volume loss of at most 4%, more typically at most 3%. A volume loss of 1-3% is common. Without wishing to be bound by any particular theory or explanation, it is believed that, for a given total bubble volume within a microsphere, the pressure resistance is higher for those in which multiple bubbles are present than for those containing only a single bubble.

Preparation of the Microspheres

The process for manufacturing glass microspheres containing multiple bubbles according to the invention requires that precursor glass particles be heated to temperatures that provide glass viscosities between certain limits. These limits can be defined by what is referred to in the glass industry as the "viscosity reference points", where the temperature that provides a glass viscosity of $10^{7.65}$ Poise is considered the softening point, and the temperature that provides a glass viscosity of $10^{4.0}$ Poise is considered the working point. The region between the working point and softening point is referred to as the working range of the glass. A glass particle having a temperature above the softening point but below the working point will have the potential to nucleate bubbles, particularly if the glass contains at least a minimum amount of dissolved sulfate, which is capable of forming bubbles of $SO_3$ or other gases. However, if the temperature is too low, insufficient gas may be formed to produce a suitable volume fraction of bubbles in the microsphere. On the other hand, too high a temperature (and thus too low a glass viscosity) typically results in a significant amount of coalescence of many smaller bubbles to form fewer but larger bubbles within a microsphere. Also, if the bubbles migrate to the surface of the sphere, they are lost completely. Both the coalescence of smaller bubbles into larger ones and the loss of bubbles by the escape of gas to the surface of the sphere reduce light scattering, and are therefore undesirable for the purposes of the invention. However, with a minimum of routine experimentation, temperature conditions may be found for a given glass composition that provide a viscosity such that gas bubbles form but lack the time to undergo excessive amounts of coalescence or migration to the surface. In such a case, relatively large numbers of particles contain multiple bubbles. Under the conditions required for the formation of suitable numbers and volumes of gas bubbles according to the invention, the particles are also of sufficiently low viscosity that they spheridize (form spheres). Therefore, typically at least 90 wt % of the beads are measured to be spherical as determined by particle count using optical microscopy, counting as "spherical" all particles with an aspect ratio of 1.2 or less.

A generally applicable method for finding suitable working conditions for formation of the microspheres of this invention is to vary the feed rate of ground glass of a given type into a vertical flame system such as described in the examples using a constant gas feed, which in the Examples is 850 scfm. Other gas feed rates may of course be used, depending on the scale of the equipment, and these are easily identified by the skilled artisan for any particular situation. In general, as the ground glass feed rate increases, the temperature of the glass particles in the flame decreases, due to the distribution of thermal energy over a larger mass of glass. Thus varying the feed rate provides a method of producing microspheres under a variety of temperature conditions. It is not necessary to know the actual temperature of the particles, since this method will allow conditions to be found wherein the desired volume and number of gas bubbles per microsphere can be achieved without specific knowledge of particle temperature in the flame. For example, using the equipment described in the Examples and a gas flow rate of 850 scfm, a very high-melting glass such as silica may enter its working range and provide microspheres according to the invention if a relatively low feed rate of particles, perhaps between 12-36 lb/hr, is used. Conversely, a low-melting glass such as A or E, or borosilicate, may produce product having the required bubble content at a feed rate of about 100-300 lb/hr.

A source of gas is needed to form the bubbles, and this is typically provided by the presence of dissolved sulfur (sulfate) in the glass. The amount of sulfate in the glass is not critical, but is typically between about 0.01 and 0.3 wt %. Sulfate in glass decomposes in the 850-860° C. temperature range, thereby producing $SO_3$ or other gaseous products capable of forming bubbles. Thus, the working range of the glass should be at least in the 850-860° C. temperature range or higher so that sufficient gas is generated to produce the desired gas volume and number of bubbles.

The particle size of the glass microspheres is determined largely by the particle size of the ground glass feed entering the spheridization process, and thus is typically controlled by classifying the feed, for example by sieving or cyclone separation, to provide the desired particle size. Various means of classification are well known in the glass art.

Glasses suitable for preparing microspheres according to the invention include as nonlimiting examples A-Glass, such as container and flat glass (softening point 650-750° C., working point 950-1050° C.), and E-Glass (softening point 750-850° C., working point 950-1050° C.), such as aluminosilicate glasses. Other suitable glasses include lime glasses, float glasses, borosilicate glasses, and titanium silicate glasses. One suitable exemplary glass is a window glass containing, by weight, 72.2% $SiO_2$, 1.2% $Al_2O_3$, 8.8% CaO, 3.3% MgO, 14.2% $Na_2O$, 0.2% $K_2O$, and 0.1% $Fe_2O_3$. Also suitable are high refractive index glasses, i.e. those having a value of about 1.6 or higher, such as for example those described in U.S. Pat. Nos. 3,193,401; 3,419,403; and 3,946,130, whose glass formulations having a refractive index of 1.6 or higher are incorporated herein by reference. In all glasses suitable for use according to the invention, an amount of $SO_3$ content sufficient to form the desired gas volume and number of bubbles is provided. Typically 0.05 to 0.5 wt % $SO_3$ content is provided in the glass by including the corresponding amount of sodium sulfate.

A number of methods are known in the art for heating glass particles to a temperature suitable for forming multiple bubbles according to the invention, and any of these may be used. For example, some embodiments of the invention employ a vertical flame process such as described in U.S. Pat. Nos. 3,129,086 and 3,230,064. These methods utilize a furnace where particles are fed into an upward flowing air and gas stream, where the gas-air mixture combusts to form a vertical flame so that the glass particles melt and form spheres in the flame zone. Other exemplary processes suitable for use according to the invention are disclosed in U.S. Pat. Nos. 2,619,776 and 2,945,326.

Compositions Containing the Microspheres

Any of a number of polymeric compositions may be whitened by incorporation of microspheres according to the invention. Such compositions may for example include polymers for injection molding or extrusion. Typical nonlimiting examples of such compositions include cured or uncured unsaturated polyester, polyamides such as nylon 6 and nylon 6,6, polyacrylates, polypropylene, polyethylene, polybutylene terephthalate, poly-phenylene sulfide, acetal resins such as polyvinyl acetal or polyvinyl butyral, or polycarbonate. Other exemplary polymeric or oligomeric materials that may benefit from inclusion of the microspheres include cured or uncured polyurethanes, cured or uncured polyureas, epoxy resins, amine hardeners, cured epoxy resins, and acrylonitrile butadiene styrene (ABS) resins. In addition to the whitening effect of the microspheres in these compositions, the presence of the microspheres may provide a variety of functional benefits to the processing and final properties of the resulting composite material. Such benefits may include increased stiffness, reduction in thermal expansion (thus enhancing shape retention), improvement in melt flow behavior (thus enabling ease of mold filling), and reduction in overall manufacturing cost via resin replacement. Typically, the spheres constitute between 1 and 60 wt % of the composition, with one or more polymers constituting at least 40 wt %. The microspheres may also be used in other compositions such as paints, coatings, and adhesives, as well as spackling compositions. In compositions intended for use in paints and coatings, the microspheres may be admixed with a liquid carrier and at least one film-forming polymer, and optionally other ingredients such as dyes, pigments, and other additives known in the paint and coating art.

EXAMPLES

In the following examples, the whiteness of polymer composites containing the microspheres of this invention was assessed by determining the L value of the composite according to the Hunter L, a, b method, well known in the art. In Examples 1-3, the composites were prepared using a clear casting polyester resin sold under the name #99 Clear Polyester Molding Resin by Fibre Glast Development Corporation, Brookville, Ohio, using a methyl ethyl ketone peroxide hardener mixed in at 2 wt % relative to the polyester. The microspheres were added at 25 wt % based on the total composite and mixed to ensure no air bubbles were trapped in the hardened product. Color values (CIE standard L, a, b values) were measured using a commercially available Hunter Colorquest calorimeter. The instrument was set up to use Primary "D65" (Northern Skylight) illumination at 0°/45° incidence angle, and configured to measure diffuse reflection.

Example 1

An A-type glass composition having a density of 2.51 g/cc was ground and classified to yield a distribution with the following breakdown (in volume %): 10%: 4.6 μm, 50%: 17.2 μm, 90%: 43.5 μm, where the particle size numbers indicate that size below which the indicated percentage of particles fall. The particles were fed into an upwardly flowing natural gas-air stream and vertically carried through a combustion zone using an apparatus similar to that described in U.S. Pat. No. 2,619,776, at a rate of 306 lbs/hour using 850 standard cubic feet per hour (scfh) of natural gas at an air/gas ratio of 2.14, with total air flow at 1818 scfh. The resulting product was collected in a cyclone and had an average density of 2.39 g/cc, corresponding to a 4.8% trapped bubble volume, and a size distribution with the following breakdown (in volume %): 10%: 3.3 μm, 50%: 18.8 μm, 90%: 43.4 μm. The trapped bubble volume was calculated according to the following equation:

% bubble volume=[1−(D/2.51)]×100 where D is the glass microsphere density. The particles were incorporated in a polyester resin as defined above, and yielded a color value of L=58.8, a=−0.2, and b=2.8.

Example 2

The same glass particle feed used in Example 1 was fed into the same furnace, at a rate of 262 lbs/hour using 850 scfh of natural gas at an air/gas ratio of 2.14, with total air flow at 1818 scfh. The resulting product was collected in a cyclone and had an average density of 2.36 g/cc, corresponding to a 5.98% trapped bubble volume, and a size distribution with the following breakdown (in volume %): 10%: 2.2 μm, 50%: 17.1 μm, 90%: 41.8 μm. The particles were incorporated in a polyester resin as defined above, and yielded a color value of L=64.1, a=−0.3, and b=3.0.

Example 3

The same glass particle feed used in Example 1 was fed into the same furnace, at a rate of 175 lbs/hour using 850 scfh of natural gas at an air/gas ratio of 2.14, with total air flow at 1818 scfh. The resulting product was collected in a cyclone and had an average density of 2.27 g/cc, corresponding to a 9.6% trapped bubble volume, and a size distribution with the following breakdown (in volume %): 10%: 2.0 μm, 50%: 17.5 μm, 90%: 42.3 μm. The particles were incorporated in a polyester resin as defined above, and yielded a color value of L=69.3, a=−0.5, and b=3.2.

Example 4

Glass microspheres having a density of 2.05 g/cc, corresponding to an 18.3% trapped bubble volume, and having a size distribution of 10%: 2.3, 50%: 19.6, 90%: 45.3 μm, were produced according to the general procedure of Examples 1-3. The microspheres were incorporated at a 50 wt % level in nylon 6 (EMS-Grivory Grilon BS/2 Nucleated Nylon 6, available from EMS-CHEMIE of Sumter, S.C.) and subsequently injection molded to form a sample having a color value of L=73.35, a=−1.28, and b=6.46.

Example 5

An experiment was performed to determine the effect of using single bubble microspheres of similar trapped volume versus multiple bubble microspheres on the color of polyester resin composites containing the spheres. Microspheres produced as defined in the previous examples and having a density of 2.17 g/cc and the following breakdown in particle size (in volume %): 10%: 6.4 μm, 50%: 20.3 μm, 90%: 44.9 μm, with a trapped bubble volume of 13.6%, were incorporated in a polyester resin to yield a color value of L=71.6, a=−0.74, and b=3.80.

Essentially solid microspheres were produced in a similar way, but having a density of 2.50 g/cc and the following breakdown in particle size (in volume %): 10%: 6.2 μm, 50%: 19.8 μm, 90%: 46.7 μm, with a trapped bubble volume of only 0.4%. Upon incorporation in a polyester resin, a color value of L=43.9, a=0.15, and b=0.84 was obtained.

A third batch of microspheres was prepared having single bubbles inside each particle, an average density of 0.59 g/cc, and a breakdown in particle size (in volume %) as follows: 10%: 11.6 μm, 50%: 21.9 μm, 90%: 36.00 μm. Thus the particle size was similar to that of the essentially solid microspheres described above. A 3.06-g portion of these hollow microspheres was blended with a 9.44-g portion of the solid microspheres to yield mixture with an average trapped bubble volume of 13.5%. The relative amounts of solid and hollow spheres were thus 75.5 wt % solid sphere and 24.5 wt % hollow sphere, and 42.1 vol % solid sphere and 57.9 vol % hollow sphere. Thus the average density of the microspheres in this blend was 2.17 g/cc, matching the density of the microspheres made according to the invention.

The blend of hollow and solid microspheres was incorporated in a polyester resin to yield a color value of L=75.1, a=0.09, and b=5.2. The composite showed a significant amount of agglomeration of glass microspheres at the surface, apparently due to floating-out of the hollow spheres, whose density of 0.59 g/cc was significantly lower than the ~1.1 g/cc density of the polymer. Such floating-out was not observed with the composite made with the microspheres of this invention.

Example 6

Each of the microsphere samples described in Example 5 are subjected to a 3000-psi pressurization for 30 seconds, to determine their resistance to breakage under typical composite processing conditions. The blend of solid and hollow microspheres exhibits a volume loss of about 3.68%, due almost entirely to breakage of the 0.59 g/cc density microspheres, while the sample of microspheres according to the invention having an average density of 2.17 g/cc exhibit less than a 2.0% volume loss.

As can be seen from a review of Examples 5 and 6, microspheres according to the invention were capable of providing a whitening effect similar to that of a blend of solid and hollow microspheres having a similar overall density, but noticeably less float-out of microspheres occurred using the product of this invention. The amount of breakage during use in compounding applications, as indicated by the 3000-psi pressure test, is expected to be considerably lower for the microspheres of this invention.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A composition comprising glass spheres, the spheres comprising on average a total gas bubble volume of between 10 and 12% relative to an average sphere volume, and wherein the spheres have a d50 of between 5 and 100 μm and at least 10% by number of the spheres incorporate at least two gas bubbles.

2. The composition of claim 1, wherein the spheres have an average density of at least 1.10 g/cc.

3. A composition comprising glass spheres, the spheres comprising on average a total gas bubble volume of at least 8% and at most 35% relative to an average sphere volume, wherein the spheres have a d50 of between 5 and 100 μm and at least 10% by number of the spheres incorporate at least two gas bubbles; and wherein the spheres have an average density between 1.90 and 2.51 g/cc.

4. The composition of claim 3, wherein at least 20% of the spheres incorporate at least two gas bubbles.

5. The composition of claim 3, wherein a fraction of the spheres have a size of 10 μm or larger, at least 12% of said fraction comprising at least two bubbles.

6. The composition of claim 3, wherein a fraction of the spheres have a size of 10 μm or larger, at least 30% of said fraction incorporating at least two bubbles.

7. The composition of claim 3, wherein the total gas bubble volume is between 8 and 20% relative to the average sphere volume.

8. The composition of claim 3, wherein the spheres have an average density between 2.15 and 2.30 g/cc.

9. The composition of claim 3, wherein the spheres have a d50 of between 10 and 50 μm.

10. The composition of claim 3, wherein the spheres have a d50 of between 20 and 40 μm.

11. The composition of claim 3, wherein the spheres comprise an A-type glass.

12. The composition of claim 3, wherein the spheres comprise an E-type glass.

13. The composition of claim 3, wherein the spheres comprise a borosilicate glass.

14. The composition of claim 3, wherein the spheres comprise a glass having a refractive index of at least 1.6.

15. The composition of claim 3, wherein the spheres have a volume loss, after pressurization to 3000 psi, of at most 4%.

16. The composition of claim 3, wherein the spheres have a volume loss, after pressurization to 3000 psi, of at most 3%.

17. The composition of claim 3, wherein the spheres provide a Hunter L value of at least 60 when incorporated at a 25 wt level in a cured polyester composite.

18. The composition of claim 3, wherein the spheres provide a Hunter L value of at least 70 when incorporated at a 25 wt % level in a cured polyester composite.

19. The composition of claim 3, wherein at least 20% of the spheres comprise at least two gas bubbles and the spheres have a d50 of between 10 and 50 μm.

20. The composition of claim 3, further comprising at least one polymer, wherein the spheres constitute between 1 and 60 wt % of the composition and the at least one polymer constitutes at least 40 wt % of the composition.

21. The composition of claim 20, wherein the at least one polymer comprises a thermoplastic polymer.

22. The composition of claim 21, wherein the thermoplastic polymer comprises a polyamide, a polyacrylate, polypropylene, polyethylene, an acrylonitrile butadiene styrene resin, or a mixture of any of these.

23. The composition of claim 20, wherein the at least one polymer comprises a thermosetting polymer.

24. The composition of claim 23, wherein the thermosetting polymer comprises a cured or uncured polyurethane, a cured or uncured polyurea, an epoxy resin, an amine hardener, or a cured epoxy resin.

25. The composition of claim 20, wherein the at least one polymer comprises a cured or uncured unsaturated polyester.

26. A composition comprising glass spheres, the spheres comprising on average a total gas bubble volume of at least 8% and at most 35% relative to an average sphere volume, wherein the spheres have a d50 of between 5 and 100 μm and at least 10% by number of the spheres incorporate at least two gas bubbles; the composition further comprising a liquid carrier and at least one film-forming polymer.

27. The composition of claim 1, wherein the spheres have a d50 of between 10 and 50 μm.

28. The composition of claim 1, wherein the spheres have a d50 of between 20 and 40 μm.

29. The composition of claim 1, wherein the spheres comprise an A-type glass.

30. The composition of claim 1, wherein the spheres comprise an E-type glass.

31. The composition of claim 1, wherein the spheres comprise a borosilicate glass.

32. The composition of claim 1, wherein the spheres provide a Hunter L value of at least 60 when incorporated at a 25 wt % level in a cured polyester composite.

33. The composition of claim 1, wherein the spheres provide a Hunter L value of at least 70 when incorporated at a 25 wt % level in a cured polyester composite.

34. The composition of claim 1, further comprising at least one polymer, wherein the spheres constitute between 1 and 60 wt % of the composition and the at least one polymer constitutes at least 40 wt % of the composition.

35. The composition of claim 34, wherein the at least one polymer comprises a thermoplastic polymer.

36. The composition of claim 35, wherein the thermoplastic polymer comprises a polyamide, a polyacrylate, polypropylene, polyethylene, an acrylonitrile butadiene styrene resin, or a mixture of any of these.

37. The composition of claim 34, wherein the at least one polymer comprises a thermosetting polymer.

38. The composition of claim 37, wherein the thermosetting polymer comprises a cured or uncured polyurethane, a cured or uncured polyurea, an epoxy resin, an amine hardener, or a cured epoxy resin.

39. The composition of claim 34, wherein the at least one polymer comprises a cured or uncured unsaturated polyester.

* * * * *